Jan. 9, 1968     G. W. ROYSTER, JR., ET AL     3,362,141
SURFACE CONTAMINATION SAMPLER
Filed May 13, 1966

INVENTORS.
George W. Royster Jr.
BY   Birney R. Fish

ATTORNEY.

3,362,141
SURFACE CONTAMINATION SAMPLER
George W. Royster, Jr., Oak Ridge, and Birney R. Fish, Knoxville, Tenn., assignors to the United States of America as represented by the United States Atomic Energy Commission
Filed May 13, 1966, Ser. No. 551,184
1 Claim. (Cl. 55—419)

ABSTRACT OF THE DISCLOSURE

Surface-bearing dust-like particulate matter containing possible contaminants are monitored by obtaining representative samples of the particulate matter. A tubular housing is provided with a plurality of passageways circumferentially spaced thereabout and communicating with the interior of the housing and a removable filter. The housing is placed against a surface to be sampled and compressed air is passed through the passageways to drive the matter from the surface and onto the filter where such matter is retained for subsequent examination.

---

Figure 1:
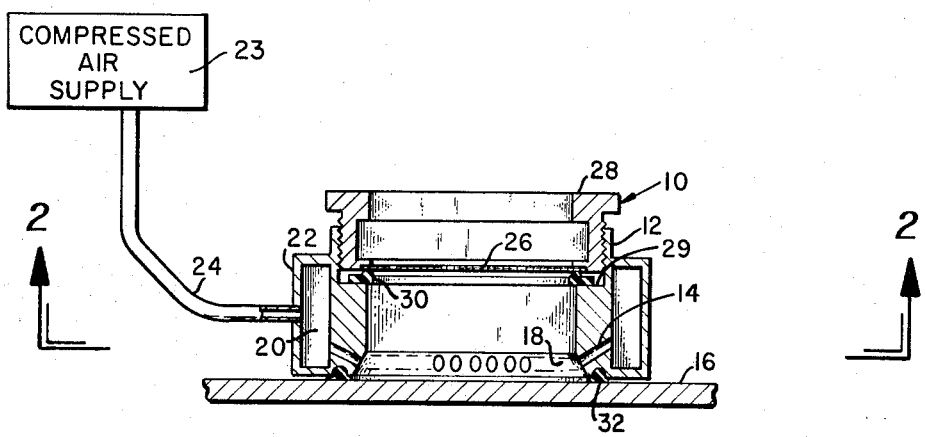

The invention described herein was made in the course of, or under, a contract with the U.S. Atomic Energy Commission. This invention relates generally to means for obtaining samples of air-suspendable particulate matter, and more particularly to a device for driving possibly contaminated particulate matter from particle-bearing surfaces and for capturing such particulate matter for subsequent examination.

The monitoring of dust-like particulate matter found in industrial complexes, laboratories, temporary or permanent field stations, etc., is becoming of increasing importance due to the possible presence of radioactive or other harmful contaminants in the particulate matter. A widely accepted technique of monitoring for the presence of such contaminants is to obtain for subsequent examination representative samples of particulate matter from work area surfaces, e.g., tables, floors, equipment, etc., upon which air-borne contaminants may have settled or contaminants from other origins may have otherwise been deposited.

Previously practiced methods for obtaining samples of "loose" or resuspendable particulate matter which may possibly contain contaminants suffer several shortcomings or drawbacks that prevent or render difficult the obtainment of successive samplings in an accurate and precise manner. For example, a commonly practiced sampling procedure known as "smear" sampling involves the rubbing of a small piece of filter paper with a predetermined force over a specified area of the surface being checked to gather particulate matter for subsequent examination. While the size of the filter paper can be accurately controlled, the size of the wipe area and the applied pressure varies from sample to sample due to the differences in wiping techniques employed by the various individuals doing the sampling. Further, tests have shown that smear sampling has a negative correlation with the fraction of dust resuspended from common work area surfaces.

Attempts to provide mechanisms capable of obtaining more accurate samplings have met with only limited success. One of the more successful mechanisms previously used to obtain samples comprises an inverted cup which has the interior thereof in registry with an evacuation system and includes a plurality of throughgoing apertures in the side wall of the cup. In the operation of this mechanism an open end of the cup is placed against a surface to be checked and the evacuation system is then actuated to draw air into the cup interior through the apertures. This air drawn into the cup sweeps loose particles from the surface being checked and carries them to a suitable filter disc in the cup for capture thereby. While this vacuum-operated sampling mechanism is an improvement over the smear sampling technique and provides a positive correlation with the quantity of particulate matter resuspended from the work area surface, it still has several shortcomings which impair or detract from its over-all usefulness. For example, unless a uniform rate of air flow is provided through the cup for each sampling the sampling results from repeated samplings will vary excessively. Consequently, this type sampling device is practical only if each sampling is obtained by using the same evacuation system, since the pumping speeds of vacuum pumps sufficiently differ from one another even when the pumps are similarly rated. Another shortcoming is due to the fact that vacuum pumping systems are not readily portable so as to prevent or make very difficult the use of the vacuum sampler in the field or other locations remote to an evacuation system. The operation of the vacuum sampler may also pose some problems in that unless a tight seal is maintained between the bottom edge of the cup and the surface being checked the rate of air flow into the cup will not be uniform from sample to sample nor will the air flow redisperse or sweep the particulate matter from the entire confined surface to provide the desired sampling. Additionally, air drawn into the cup through the apertures or between the seal and the surface by the evacuation system may contain some contaminated particles from the surrounding environment so as to give an erroneous reading.

The present invention aims to overcome or substantially minimize the above and other shortcomings and problems suffered by the previously known particulate sampling techniques and mechanisms by providing a new and improved sampling device whereby samples of particulate matter may be readily obtained from surfaces in a highly precise and repetitive manner regardless of the location of such surfaces. Generally, this sampling device comprises a tubular housing into which a plurality of air streams from an easily portable source of compressed air are simultaneously introduced in a highly controlled manner for creating a turbulent condition within the housing to drive the particulate matter from essentially the entire confined area of the surface being monitored into a filter carried by the housing. The air flow from the air source is controlled to assure that the pressure and/or quantity of air used to gather samples remains consistent from sampling to sampling. Also, by using such a pressurized air flow no contaminants from the surrounding environment are forced into the housing, thus minimizing some of the requirements for a tight seal between the housing and the surface since the air flow enters the housing from essentially all points of its circumference regardless of the condition of the seal. The present invention may also be used to monitor decontamination operations by collecting samples of particulate matter from decontaminated surfaces for examination. The collection of these samples may be preferably achieved by using a cleaning vapor or abrasive agent rather than air.

An object of the present invention is to provide a new and improved device for successively obtaining samples of fluid-suspendable particulate matter from particulate-bearing surfaces in a highly accurate and precise manner.

Another object of the present invention is to provide a readily portable sampling device utilizing air flow from a source of compressed air for driving particulate matter from a particulate-bearing surface into a filter for capture thereby.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 2:
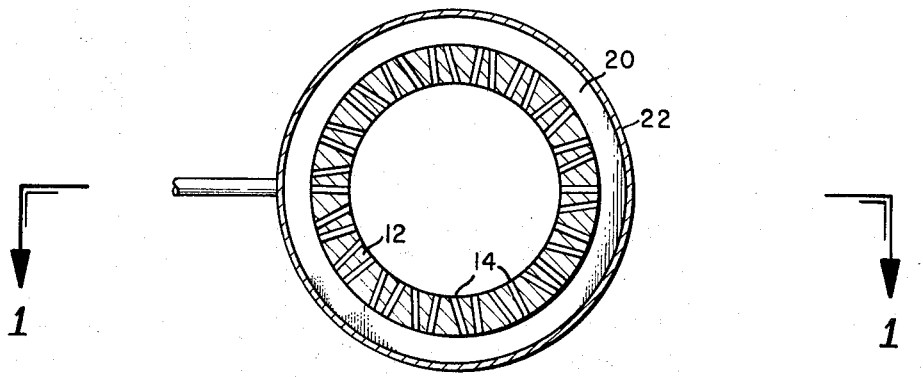

In the accompanying drawing:

FIG. 1 is a sectional view showing a preferred form of the sampling device of the present invention as it may appear in an operational relationship with a particulate-bearing surface; and FIG. 2 is a sectional plan view taken generally along line 2—2 of FIG. 1 and showing details of the air-conveying passageways in the sampling device.

In the drawing the sampling device of the present invention as generally indicated by numeral 10 is shown comprising an open-ended elongated tubular shell or housing 12 having a plurality of circumferentially spaced-apart perforations or passageways 14 adjacent one end thereof. These passageways 14 are in registry with both the inner and outer wall surfaces of the housing 12 so as to permit the conveyance of air from a location outside of the housing 12 into the interior thereof. Also, the openings to the passageways 14 in the outside wall of the housing are preferably above the passageway openings in the inside wall of the housing, as shown in FIG. 1, for assuring that the air entering the housing 12 is initially directed towards that adjacently disposed open end of the housing. This inclined orientation of the passageways 14 assures that the surface of the table or other surface, such as generally indicated at 16, carrying the particulate matter to be gathered is contacted rather vigorously by the several air streams for substantially enhancing the sweeping action of the air streams against the surface 16 to facilitate the driving of the suspendable particulate matter therefrom.

The air streams entering the housing 12 converge towards and impact against one another so as to create a turbulent flow pattern within the housing to further increase the sweeping action of the air against the surface 16. To increase this turbulence within the housing 12 and also widen or increase the area within the housing contacted by turbulent flow, adjacent pairs of the passageways 14 may be angled towards each other so that the air streams emanating therefrom contact each other at a location in close proximity to the inner wall surface of the housing. Also, if desired, the inner wall surface of the housing may be provided with an outwardly tapering surface 18 in registry with the end of the housing adjacent the passageways 14 and of such a length that the passageways 14 intercept the tapered surface 18 intermediate the ends thereof. The tapered surface 18 functions to promote the turbulent action of the air against the surface 16 by continuously urging the air towards the center of the housing interior.

The quantity of air passed into the housing 12 from the passageways 14 is preferably equally divided among the various passageways. Thus, in order to provide an equal amount of air flow through each passageway 14, an annular enclosed volume 20 common to all the passageways is disposed about the outer circumference of the housing. The volume 20 may be defined by the outer wall of the housing and an annular, generally U-shaped jacket 22 secured to the outer wall of the housing about the circumference of the latter at vertically spaced-apart locations on opposite sides of the passageways 14 as shown. This annular enclosed volume may, in turn, be coupled to a suitable air source or supply generally shown at 23 by a conduit 24 which may be carried by the jacket 22 and communicate with the volume 20.

The air supply 23 may be a conventional air gun, a cylinder of compressed air, or any other suitable structure capable of holding or providing an adequate supply of compressed air. However, while any suitable source of air may be used, it is necessary for some mechanism to be provided in either the delivery conduit or in the air source that is capable of establishing an air flow of uniform pressure and quantity to the sampling device 10 for assuring uniformity in successive samplings.

In order to collect the particulate matter driven from the surface 16 by the air streams emanating from the passageways 14, a suitable filtering disc 26 may be carried by and be disposed within the housing at a location above the passageways 14 adjacent the upper end of the housing, as shown, for filtering and retaining from the air the particulate matter driven from the surface 16. The filtering disc 26 may be of a diameter substantially similar to the inner diameter of the housing and be disposed perpendicularly to the housing walls for assuring efficient filtering of the air as it vents from the housing through the filtering disc 26. The filtering disc 26 may be held within the housing 12 by a tubular, externally threaded member 28 which may be threadedly received in the housing to clamp the filtering disc 26 to an annular shoulder 29 on the housing 12. It may be desirable to place an annular seal 30 of resilient material between the disc 26 and the shoulder 29 to assure that the particulate matter is driven into the filtering disc 26.

To insure that the entire, or essentially the entire, air flow bearing the particulate matter vents from the housing through the filtering disc, it may be preferable to use a seal arrangement between the surface 16 and the end of the housing resting thereon. A suitable seal arrangement may comprise an annular resilient seal 32 of rubber or the like which is so disposed in an annular groove in the end of the housing that a portion of the seal projects from the groove for contacting the surface 16.

In a typical application of the sampling device of the present invention, a disc-shaped filter 26 of paper or other particulate-gathering material is inserted into the housing 12 and held by the threaded member 28. The sampling device may thereafter be placed against a surface 16 to be sampled, and then a given quantity of air at a given pressure and velocity is passed into the housing interior via the conduit 24, the annular volume 20, and the passageways 14. The turbulent motion of the many discrete air streams entering the housing interior through the passageways effects the sweeping of particulate matter from the surface 16 and redisperses it in the air for subsequent capture by the filter 26 as the air vents from the housing. Upon completing the sampling the filter is removed and the particulate matter thereon examined. A new filter may then be inserted and the sampling procedure repeated.

While the filter changing has been described as being accomplished by removing and replacing the threaded member 28, it will appear clear that a more rapid technique may be employed. For example, the filter changing may be accomplished in a manner similar to that used in changing slides in a slide projector. Also, while air has been described as the fluid for driving the particulate matter from a particulate-bearing surface, it is to be understood that any other suitable fluid may be used, such as, for example, nitrogen, oxygen, etc. Or, if desired, the fluid may be a cleaning or abrasive agent in vapor or liquid form for clearing the surface of particulate matter including particulate matter adhering relatively tenaciously to the surface. When using a vapor or liquid driving fluid the particulate matter may be collected by a suitable bed or other collecting means capable of removing solids from fluid streams.

It will be seen that the present invention sets forth a new and improved device for obtaining representative samples of particulate matter from surfaces upon which particulate matter has settled or otherwise been deposited. The portability of the present sampling device is particularly advantageous for obtaining samples in a highly precise and accurate manner in the field or other heretofore relatively inaccessible locations. Another advantage of the present invention over previous sampling mechanisms is that the driving fluid, whether in gaseous or liquid form, may be injected into the housing under considerable pressure for assuring the attainment of a more efficient and complete surface sweeping or cleaning operation than attainable by using the previously known vacuum operated sampling mechanism which is limited to a maximum operating pressure of only one atmosphere.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

We claim:

1. A surface contamination sampler, comprising an open-ended tubular housing having inner and outer wall surfaces and spaced-apart end walls with said inner wall surface defining a chamber intermediate said end walls, sealing means carried by one of said end walls at one end of the chamber and adapted to contact a particulate-bearing surface for sealing one end of said chamber while placing the latter in registry with resuspendable particulate matter on the particulate-bearing surface, an annular jacket disposed about said housing and secured about the ends thereof to said outer wall surface adjacent said one end of the housing, said jacket having a wall laterally spaced from said outer wall surface for defining therewith an annular closed volume, means for supplying a flow of compressed fluid, conduit means connected to the last-mentioned means and penetrating said jacket wall and communicating with said volume for conveying the flow of compressed fluid into said volume, a plurality of circumferentially arranged and spaced-apart passageways projecting through said housing wall and communicating with said chamber and said annular volume for conveying the fluid flow from the latter into the chamber adjacent said one end, said passageways providing the entire flow of fluid into said chamber and being inclined from said volume towards said one end of the chamber for directing the fluid flow against the particulate-bearing surface defining the end closure of said chamber, said means for supplying a flow of compressed fluid directing the flow at a sufficient pressure for driving particulate matter therefrom into said chamber, and a fine filter disposed across said chamber intermediate said one end wall and the other of said end walls and secured adjacent the end wall opposite the one end wall for intercepting the particulate-containing fluid flow driven into said chamber to remove from said fluid flow the particulate matter borne thereby.

References Cited

UNITED STATES PATENTS

| | | | |
|---|---|---|---|
| 1,102,053 | 6/1914 | Johnson | 55—419 |
| 2,974,749 | 3/1961 | Donguy | 55—478 |
| 3,109,724 | 11/1963 | Heckman et al. | 73—28 |
| 3,224,434 | 12/1965 | Molumet et al. | 73—28 |

FRANK W. LUTTER, *Primary Examiner.*

HARRY B. THORNTON, *Examiner.*

B. NOZICK, *Assistant Examiner.*